Patented Feb. 10, 1931

1,791,879

UNITED STATES PATENT OFFICE

KAZUO TAKEMURA, OF MINAMI-KU OSAKA, JAPAN, ASSIGNOR OF FIFTY PER CENT TO KAZUE OIWA, OF KAWABEGUN HYOGO-KEN, JAPAN

VARNISHING PREPARATION

No Drawing. Application filed August 3, 1926. Serial No. 126,931.

This invention has reference to varnishes and has for its object the provision of a novel type of varnish the composition of which consists of certain amounts of substances such as nitro-cellulose, amyl-acetate, ether, acetone, alcohol, yellow prussiate of potash, dibutyl ester and pulverized bamboo. The formula for dibutyl ester (or butanol tartrate or dibutyl tartrate, as it is sometimes called) is $(C_4H_9)2C_4H_4O_6$. It is an ester of tartaric acid.

In the process to manufacture the varnish according to the invention, it is necessary to first dissolve nitro-cellulose in solvents such as amyl-acetate, ether and acetone. The solution which has then been diluted with alcohol or benzol, is mixed with dibutyl ester and properly agitated. To the liquid are further added the required amounts of yellow prussiate of potash and bamboo powder. The product obtained by this treatment bears by itself a shade somewhat yellowish, however if it is mixed with one or more suitable pigments it can appear in any desired colour.

In the above process, it is apparent that nitro-cellulose is thoroughly dissolved in amyl-acetate, ether and acetone, while the solution so obtained is also capable of being well thinned down with a mixture of alcohol or benzol. On account of these properties of the substances employed, it is with ease to give the fluid such a viscosity as may fit for its application by brushing or spraying. As the result of the addition of dibutyl ester to the solution, the fluid acquires a desired elasticity of the resulting film when it is applied as a coating. In experiment, it has been proved that a metal plate or wire coated with the varnish according to the invention could be bent or wound up as much as desired without causing any cracking or flaking on the film of the coating. Further advantage has been tested in drilling a metal work when I witnessed that the film of the varnish coated thereon was peeled out entirely in one piece with the flakes of the metal cut off, thereby imparting no harm to the surrounding portions.

To make the elasticity and viscosity of the product greater, I have used pulverized bamboo, which, when mixed with the fluid, increases the durability and resisting power of the varnish. In this respect, I have found pulverized bamboo to be a very useful "body".

In the actual process for the manufacture, the following composition may be one which is appropriate:—

| | Grams |
|---|---|
| Nitro-cellulose | 15 |
| Amyl-acetate | 35 |
| Ether | 10 |
| Acetone | 10 |
| Alcohol | 20 |
| Dibutyl ester | 5 |
| Yellow prussiate of potash | 3 |
| Pulverized bamboo | 5 |

The given amounts of the substances should be treated as described above.

In use, if the varnish is applied to ironwork, yellow potassium prussiate is combined with iron, forming iron cyanide which deposits by itself on the surface of the work in the form of film, serving as the coating for anti-corrosion. This makes the substance especially suitable for use in connection with ironwork. In the case where the varnish is applied to the bottom of a boat, the presence of cyanic acid in the fluid prevents shells from attaching to the surface, and moreover the smooth even coating diminishes the water-resisting power of the boat to a great extent.

By reason of the highly insulating properties, the varnish according to the invention is capable of being used as coating for electric wires and windings, in place of silk, gum and other known substances. The advantage of the present manufacture over these known substances consists not only in the diminution of the space it occupies, but in the cheapness of cost.

Further advantage may be pointed out in fact that the varnish manufactured as above described, leaves, when applied to woodwork, no brush-marks, imparting an evenly coated glossy finish on the surface of the work. This can hardly be expected of the known paints or varnishes.

Having now particularly described and ascertained the nature of my said invention and in what manner the same is to be performed, I declare that what I claim is:—

A varnish comprising nitro-cellulose, yellow prussiate of potash and pulverized bamboo.

In testimony whereof I hereunto affix my signature.

KAZUO TAKEMURA.